(12) United States Patent
Lu

(10) Patent No.: US 8,402,233 B2
(45) Date of Patent: Mar. 19, 2013

(54) METHOD AND APPARATUS FOR HIGH THROUGHPUT MASS STORAGE DEVICE INTERFACE IN A MICROPROCESSOR FOR HANDHELD SYSTEMS

(75) Inventor: Paul Yang Lu, Los Altos, CA (US)

(73) Assignee: Broadcom Corporation, Irvine, CA (US)

( * ) Notice: Subject to any disclaimer, the term of this patent is extended or adjusted under 35 U.S.C. 154(b) by 2082 days.

(21) Appl. No.: 11/220,731

(22) Filed: Sep. 7, 2005

(65) Prior Publication Data

US 2007/0073927 A1    Mar. 29, 2007

(51) Int. Cl.
    *G06F 12/00*    (2006.01)
(52) U.S. Cl. ........................................ 711/157; 711/115
(58) Field of Classification Search .................. None
    See application file for complete search history.

(56) References Cited

U.S. PATENT DOCUMENTS

| 5,535,333 | A  | * | 7/1996 | Allen et al. | 709/212 |
| 6,754,765 | B1 | * | 6/2004 | Chang et al. | 711/103 |
| 2003/0126343 | A1 | * | 7/2003 | Olarig et al. | 710/306 |
| 2006/0064557 | A1 | * | 3/2006 | Gold et al. | 711/157 |

\* cited by examiner

*Primary Examiner* — Denise Tran
(74) *Attorney, Agent, or Firm* — Sterne, Kessler, Goldstein & Fox P.L.L.C.

(57) ABSTRACT

Certain embodiments of a method and apparatus for high throughput mass storage device interface in a microprocessor for handheld systems may comprise interleaving accesses to a plurality of mass storage devices communicatively coupled to a portable media processing device. Interleaved transfer may occur of data corresponding to the interleaved accesses to the plurality of mass storage devices communicatively coupled to the portable media processing device. At least a portion of the plurality of mass storage devices may be communicatively coupled internally to the portable media processing device. A remaining portion of the plurality of mass storage devices may be communicatively coupled externally to the portable media processing device.

30 Claims, 10 Drawing Sheets

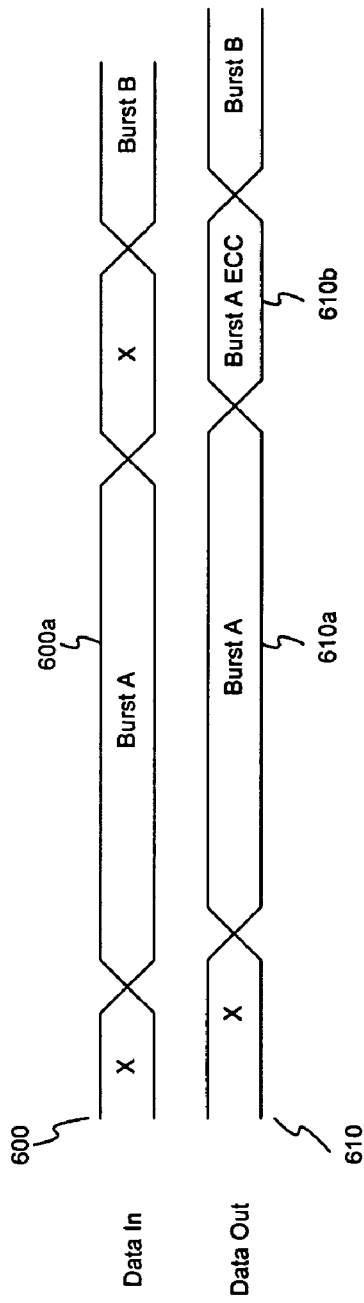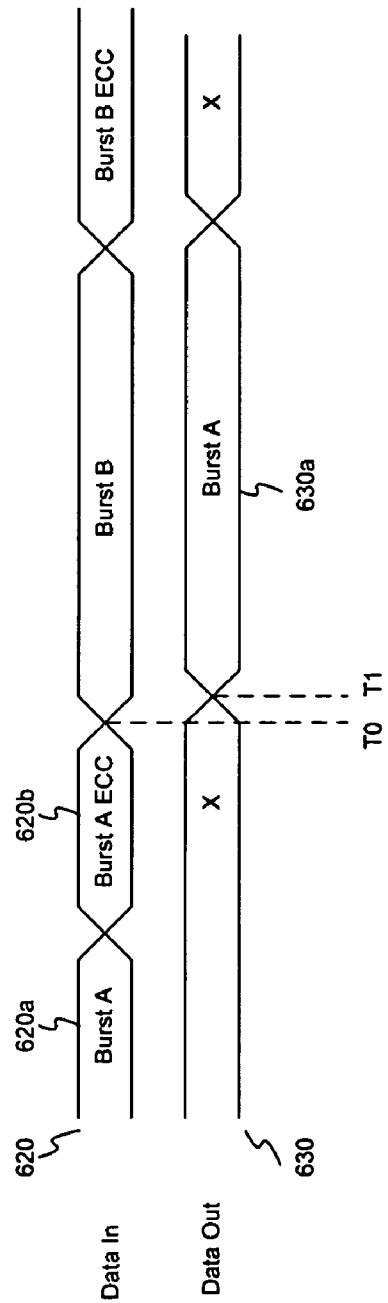
Fig. 6a
Fig. 6b

METHOD AND APPARATUS FOR HIGH THROUGHPUT MASS STORAGE DEVICE INTERFACE IN A MICROPROCESSOR FOR HANDHELD SYSTEMS

CROSS-REFERENCE TO RELATED APPLICATIONS/INCORPORATION BY REFERENCE

Not Applicable.

FIELD OF THE INVENTION

Certain embodiments of the invention relate to mass storage devices. More specifically, certain embodiments of the invention relate to a method and apparatus for high throughput mass storage device interface in a microprocessor for handheld systems.

BACKGROUND OF THE INVENTION

As mass storage devices (MSDs) are continuously developed, each new generation of MSDs stores a greater amount of data in handheld systems than the previous generation of MSDs. These new MSDs include FLASH chips and built-in micro hard disks that may be hardwired or may be plugged into the handheld systems, and plug-in memory cards. The plug-in memory card may use a standard interface, such as, for example, secure digital (SD) interface specification, a MultiMedia Card (MMC) interface specification, or the serial peripheral interface (SPI) interface specification. The MSDs that may be hardwired, for example, the micro hard disk, may also use the SD, MMC, or SPI interface.

Generally, data may be transferred from external memory by, for example, a CPU, or microprocessor, to an internal input/output (I/O) buffer in the MSD, and the data in the I/O buffer may be written to the MSD. In this manner, the CPU may quickly transfer data that is to be written to the MSD and continue with other tasks while the MSD completes writing data to the buffer. Similarly, data that is to be read from the MSD may be read from the internal storage locations of the MSD and stored in the I/O buffer and the CPU may then read the buffered data.

For example, FLASH chips may store data in "pages" where each page may have the capability to store about 2 kilobytes (KB) of data. During a write cycle to a FLASH chip, a programming device, for example, a microprocessor, may sequentially send write commands, page addresses, page data, and program commands to the FLASH chip. The page data for the MSD may be stored in the I/O buffer of the MSD. The write cycle for each byte written to the I/O buffer may be as short as 35 nanoseconds (ns). However, programming the I/O buffer data to the memory array in the FLASH chip may take a longer time, for example, 1 millisecond (mS) per 2 KB page. While the data is being programmed or written to a memory array in a FLASH device, a response signal may be de-asserted by the FLASH device to indicate that it is busy. When the programming of the data in the I/O buffer is finished, the FLASH chip may assert the response signal to indicate that it is ready for further accesses. The CPU may poll the response signal to determine when further accesses may be made to the FLASH chip. The incident waste of CPU processing may be undesirable.

During a read cycle from a FLASH chip, the CPU may sequentially send out a read command, page address, and fetch command. The read command may indicate to the FLASH chips to fetch a page of data from the page address in the memory array to the I/O buffer. This may take, for example, 50 microseconds (µs) for the FLASH chip to fetch a byte of data from the memory array to the I/O buffer. During the fetch cycle, the FLASH chip may de-assert the response signal to indicate that it is busy. The CPU may poll the response signal to determine when further accesses may be made to the FLASH chip. The incident waste of CPU processing may be undesirable. After data is fetched into the I/O buffer, the CPU may read the data from the I/O buffer at a fast rate, for example, of 35 ns per byte.

The time that a FLASH chip may spend in programming the memory array in the FLASH chip and/or fetching data from the memory array may be wasted for the CPU if it must poll the FLASH chips to see when it has completed that task. Additionally, the MSDs may trade data integrity for storage capacity, and may depend on an error correction code (ECC) to aid in minimizing bit errors that may occur. In some FLASH chips, for example, 16 extra bytes may be allocated for the ECC for each 2 KB page. The 16-byte ECC may be sufficient to correct 24 bits of random errors in the 2 KB page. However, ECC generation during writes to the MSDs and correction during reads from the MSDs may be very computation intensive, and may further waste the CPU's processing resources.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for a high throughput mass storage device interface in a microprocessor for handheld systems, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 6a is an exemplary timing diagram illustrating writing of ECC to a mass storage device, in accordance with an embodiment of the invention.

FIG. 6b is an exemplary timing diagram illustrating reading of data and ECC from a mass storage device, in accordance with an embodiment of the invention.

DETAILED DESCRIPTION OF THE INVENTION

Certain embodiments of the invention may be found in a method and apparatus for high a throughput mass storage device interface in a microprocessor for handheld systems. Aspects of the method may comprise interleaving accesses to a plurality of mass storage devices communicatively coupled to a handheld system, for example, a portable media processing device. Interleaved transfer may occur of data corresponding to the interleaved accesses to the plurality of mass storage devices communicatively coupled to the portable media processing device. At least a portion of the plurality of mass storage devices may be communicatively coupled internally to the portable media processing device. A remaining portion of the plurality of mass storage devices may be communicatively coupled externally to the portable media processing device.

Figure 1:
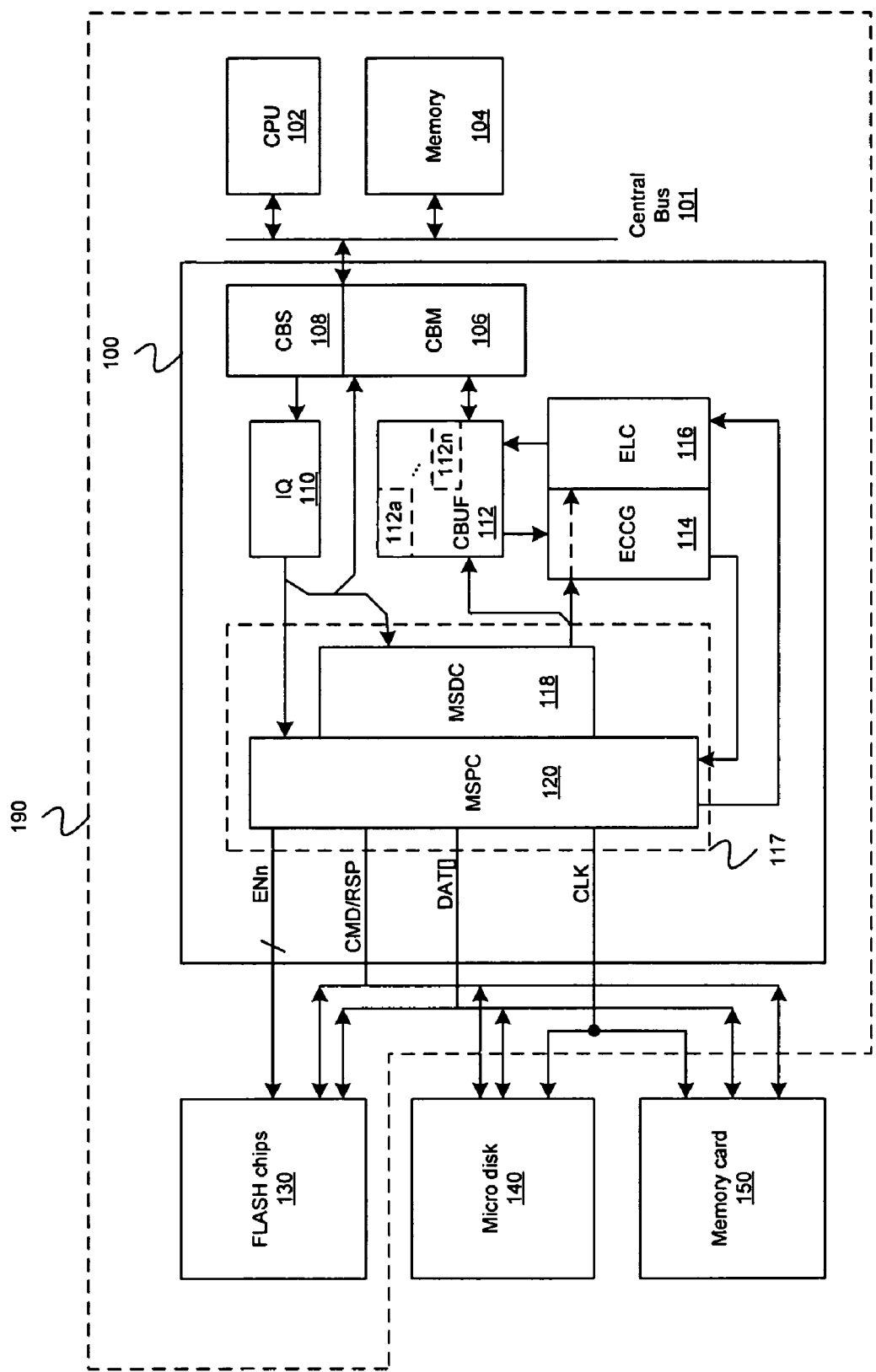
FIG. 1 is a block diagram of an exemplary architecture of a mass storage interface module, in accordance with an embodiment of the invention.

FIG. 1 is a block diagram of an exemplary architecture of a mass storage interface module, in accordance with an embodiment of the invention. Referring to FIG. 1, there is shown a portable media processing device 190 and mass storage devices (MSDs) 140 and 150. The portable media processing device 190 may comprise a mass storage interface module 100, a central bus 101, a central processing unit (CPU) 102, a system memory 104, and a MSD 130. The mass storage interface module 100 may comprise a central bus master (CBM) 106, a central bus slave (CBS) 108, an instruction queue (IQ) 110, a central bus buffer (CBUF) 112, an error correction code generator (ECCG) 114, an error locator and corrector (ELC) 116, and a mass storage controller (MSC) 117. The CBUF 112 may comprise a plurality of buffers 112a, ..., 112n. The mass storage controller 117 may comprise a mass storage data controller (MSDC) 118, and a mass storage port controller (MSPC) 120.

The CPU 102, the system memory 104, the central bus master (CBM) 106, and the central bus slave (CBS) 108 may be coupled to the central bus 101. Accordingly, data may be communicated from each of the CPU 102, the system memory 104, the CBM 106, and the CBS 108 to any other component of the CPU 102, the system memory 104, the CBM 106, and the CBS 108. The CBS 108 may be coupled to the IQ 110 and the IQ 110 may be coupled to the CBM 106, the mass storage data controller (MSDC) 118, and the mass storage port controller (MSPC) 120. The central bus master (CBM) 104 may additionally be coupled to the CBUF 112, and the CBUF 112 may be coupled to the ECCG 114 and the ELC 116. The ECCG 114 may be coupled to the MSDC 118 and to the MSPC 120. The ELC 116 may be coupled to the MSPC 120. The MSDC 118 may be coupled to the MSPC 120, the ELC 116, the ECCG 114, and the CBUF 112. The MSPC 120 may be utilized to communicate data, address, command and/or status signals to the MSDs 130, 140, and 150.

The CBM 106 may comprise suitable circuitry, logic and/or code that may be adapted to arbitrate for control of a system bus, for example, the central bus 101, and transfer data to and from other devices connected to the central bus 101. The arbitration may be with other bus masters, for example the CPU 102. The CBM 106 may take control of the bus to transfer data, for example, from the system memory 104 to the CBUF 112.

The CBS 108 may comprise suitable circuitry, logic and/or code that may be adapted to interface with the CPU 102 via the central bus 101. The CPU 102 may, via the CBS 108, store instructions in the IQ 110. The instructions stored in the IQ 110 may be instructions that may be executed at a later time by the CBM 106, the MSDC 118, and/or the MSPC 120 to transfer data to or from the MSDs 130, 140, and 150 and the system memory 104. Alternatively, the data transfer may occur between any of the MSDs 130, 140, and 150.

The IQ 110 may comprise suitable circuitry, logic and/or code that may be adapted to appropriately communicate the stored instructions to the CBM 106, the MSDC 118, and/or the MSPC 120.

The CBUF 112 may comprise suitable circuitry, logic and/or code that may be adapted to store data from the MSDs 130, 140, and 150, and/or the system memory 104. Each of the plurality of buffers 112a, ..., 112n may store a memory page of data. The memory page of data may be, for example, 2 KB of data. The plurality of buffers 112a, ..., 112n may be used, for example, when interleaving transfer of data to/from two or more MSDs.

The ECCG 114 may comprise suitable circuitry, logic and/ or code that may be adapted to generate an error correction code that may be, for example, 16 bytes long, from data that may be communicated from the CBUF 112 to the MSDs 130, 140, and 150.

The ELC 116 may comprise suitable circuitry, logic and/or code that may be adapted to receive and use an error correction code from the MSD 130, 140, or 150 to locate and fix a finite number of bit errors in data received from the MSD 130, 140, or 150. The number of bit errors that may be located and corrected may be, for example, 24 bits if the error correction code is 16 bytes long for 2 KB of data.

The MSDC 118 may comprise suitable circuitry, logic and/or code that may be adapted to control data flow from the CBUF 112 to the ECCG 114, and from the ECCG 114 to the MSPC 120 during a write to an MSD 130, 140, or 150. During a read from an MSD 130, 140, or 150, the MSDC 118 may be adapted to control data flow from the MSPC 120 to the ELC 116, and from the ELC 116 to the CBUF 112.

The MSPC 120 may comprise suitable circuitry, logic and/ or code that may be adapted to control communication of address, commands, and/or data to the MSDs 130, 140, and 150. The MSPC 120 may share signals to the various MSDs 130, 140, and 150 rather than using individual signals to each of the MSDs in order to reduce the pinout count for the MSPC 120. For example, a command/response (CMD/RSP) signal and data signals may be communicated from the MSPC 120 to the MSD 130, which may comprise FLASH chips that are integrated within the portable media processing device, to the MSD 140 and the MSD 150. For example, the MSD 140 may be a micro hard disk, and the MSD 150 may be a memory card.

In operation, the CPU 102 may communicate instructions to be executed by the mass storage interface module 100 to the IQ 110 via the CBS 108. The IQ 110 may communicate appropriate instructions to the CBM 106 to transfer data between the CBUF 112 and the system memory 104. The IQ 110 may also communicate various instructions to the MSDC 118 and the MSPC 120 in order to facilitate transfer of data between the MSD 130, 140 or 150 and the CBUF 112. The CBM 106 may take control of the central bus 101 in order to transfer data from the CBUF 112 to the system memory 104, or vice versa. The MSPC 120 may communicate with the MSD 130, 140, or 150 to either write data to the MSD 130, 140, or 150, or to read data from the MSD 130, 140, or 150. Accordingly, the MSPC 120 may communicate various control signals, commands and/or addresses to the MSD 130, 140 or 150. The MSDC 118 may communicate various control signals to the CBUF 112 and to either the ECCG 114 or the ELC 116 in order to receive data from the MSD 130, 140 or 150 to the CBUF 112, or transmit data from the CBUF 112 to the MSD 130, 140 or 150, respectively.

The CBUF 112 may temporarily store data from the system memory 104 before the data is communicated to the MSD 130, 140, or 150. While data is being transmitted to the MSD 130, 140, or 150, the ECCG 114 may generate an error correction code that may be, for example, 16 bytes long for 2 KB of data. The MSDC 118 and the MSPC 120 may control the data flow so that the error correction code (ECC) generated by the ECCG 114 may be transmitted to the MSD 130, 140, or 150 where the ECC may be stored with its corresponding data. Alternatively, the CBUF 112 may temporarily store data from the MSD 130, 140, or 150 before the data is communicated to the system memory 104, or to another of the MSD 130, 140, or 150.

The error correction code may be received from the MSD 130, 140, or 150 after the data is received from the same MSD 130, 140, or 150. The ELC 116 may process this error correction code in order to determine whether any bits in the data received may be erroneous or corrupted. The ELC 116 may locate and correct the faulty bits and the corrected data may be communicated from the ELC 116 to the CBUF 112 to be stored. The stored data in the CBUF 112 may be transferred to the system memory 104 via the CBM 106. The number of bits that may be located and corrected may depend on the length of the error correction code. For example, a 16-byte error correction code for 2 KB of data may be utilized to detect and fix 24 bits that are in error.

Figure 2D:
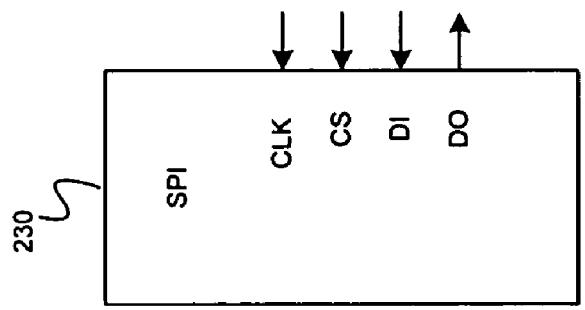
FIG. 2d is a block diagram illustrating exemplary pinout of SPI interface, which may be used in connection with an embodiment of the invention.
Figure 2C:
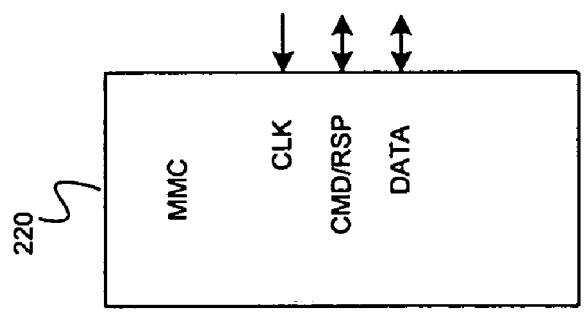
FIG. 2c is a block diagram illustrating exemplary pinout of MMC interface, which may be used in connection with an embodiment of the invention.
Figure 2B:
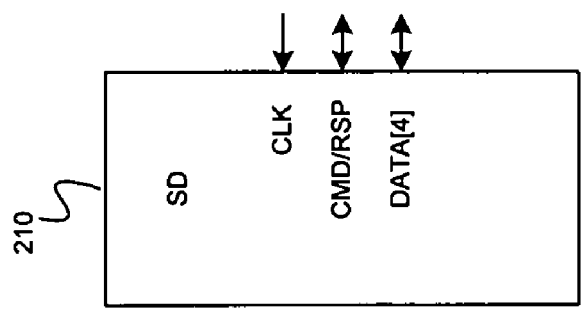
FIG. 2b is a block diagram illustrating exemplary pinout of SD interface, which may be used in connection with an embodiment of the invention.
Figure 2A:
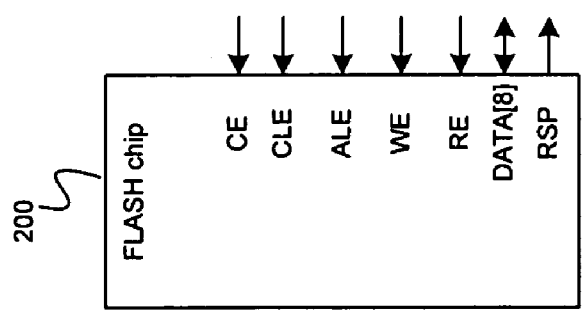
FIG. 2a is a block diagram illustrating exemplary pinout of a FLASH chip, which may be used in connection with an embodiment of the invention.

FIG. 2a is a block diagram illustrating exemplary pinout of a FLASH chip, which may be used in connection with an embodiment of the invention. Referring to FIG. 2a, there is shown a FLASH chip 200 with input signals chip enable (CE), command latch enable (CLE), address latch enable (ALE), write enable (WE), and read enable (RE). There is also shown in FIG. 2a an output signal response (RSP) and a bidirectional data signal (DATA[8]) that may comprise eight parallel signals for eight bits of data.

The chip enable signal (CE) may be asserted to select the FLASH chip 200, for example, for reading or writing data. The command latch enable signal (CLE) may be asserted to indicate to the FLASH chip 200 that a command may be present on the data signal (DATA[8]). The address latch enable signal (ALE) may be asserted to indicate to the FLASH chip 200 that an address may be present on the data signal (DATA[8]). The write enable signal (WE) may be asserted to indicate to the FLASH chip 200 that data is being communicated to the FLASH chip 200 on the data signal (DATA[8]). The data signal (DATA[8]) may communicate a command, address, or data that is to be stored in the FLASH chip 200. The command may be indicated by assertion of the command latch enable signal (CLE). The address may be indicated by assertion of the address latch enable signal (ALE). When neither the command latch enable signal (CLE) nor the address latch enable signal (ALE) is asserted, the FLASH chip 200 may treat the information on the data signal (DATA[8]) as data that may be stored in the FLASH chip 200.

The read enable signal (RE) may be asserted to indicate to the FLASH chip 200 that the data presently output on the data signal (DATA[8]) is being read, for example, by the mass storage interface module 100 (FIG. 1). De-assertion of the read enable signal (RE) may act as an indication that the FLASH chip 200 should output the next byte of data that may have been requested by, for example, the mass storage interface module 100. The FLASH chip 200 may assert the response signal (RSP) when it is ready to receive commands or data, or when it is ready to output data.

FIG. 2b is a block diagram illustrating exemplary pinout of SD interface, which may be used in connection with an embodiment of the invention. Referring to FIG. 2b, there is shown a SD interface with an input clock signal (CLK), a bidirectional command/response signal (CMD/RSP), and a bidirectional data signal (DATA[4]).

The input clock signal (CLK) may synchronize the data and commands received by the SD interface 210, and also synchronize the data and responses transmitted from the SD interface 210. The bidirectional command/response signal (CMD/RSP) may be asserted by, for example, the mass storage interface module 100 (FIG. 1) when it is sending a command. Similarly, the bidirectional command/response signal (CMD/RSP) may be asserted in order to indicate a response by a MSD, for example, the MSD 130, 140, or 150 (FIG. 1) using the SD interface. The bidirectional data signal (DATA [4]) may comprise four data lines that may be used to send address, data, and/or command to the MSD, for example, the MSD 130, 140, or 150. Similarly, the bidirectional data signal (DATA[4]) may be used by the MSD device, for example, the MSD 130, 140, or 150 that may transmit data in response to a command.

FIG. 2c is a block diagram illustrating exemplary pinout of MMC interface, which may be used in connection with an embodiment of the invention. Referring to FIG. 2c, there is shown a MMC interface with an input clock signal (CLK), a bidirectional command/response signal (CMD/RSP), and a bidirectional data signal (DATA). The signals for the MMC interface 220 may be similar to the signals for the SD interface 210 (FIG. 2b), with the exception that the bidirectional data signal (DATA) may comprise one data line. Therefore, the information that is transmitted on the bidirectional data signal (DATA) may be transmitted serially.

FIG. 2d is a block diagram illustrating exemplary pinout of SPI interface, which may be used in connection with an embodiment of the invention. Referring to FIG. 2d, there is shown a SPI interface with an input clock signal (CLK), an input chip select signal (CS), an input data signal (DI), and an output data signal (DO).

The input clock signal (CLK) may synchronize the data and commands received by the SPI interface 230, and also synchronize the data and responses transmitted from the SPI interface 230. The input chip select signal (CS) may be asserted when address, data, or command may be transmitted on the input data signal (DI). The output data signal (DO) may communicate data and/or responses to a command. The input data signal (DI) and the output data signal (DO) may communicate information serially.

Figure 3:
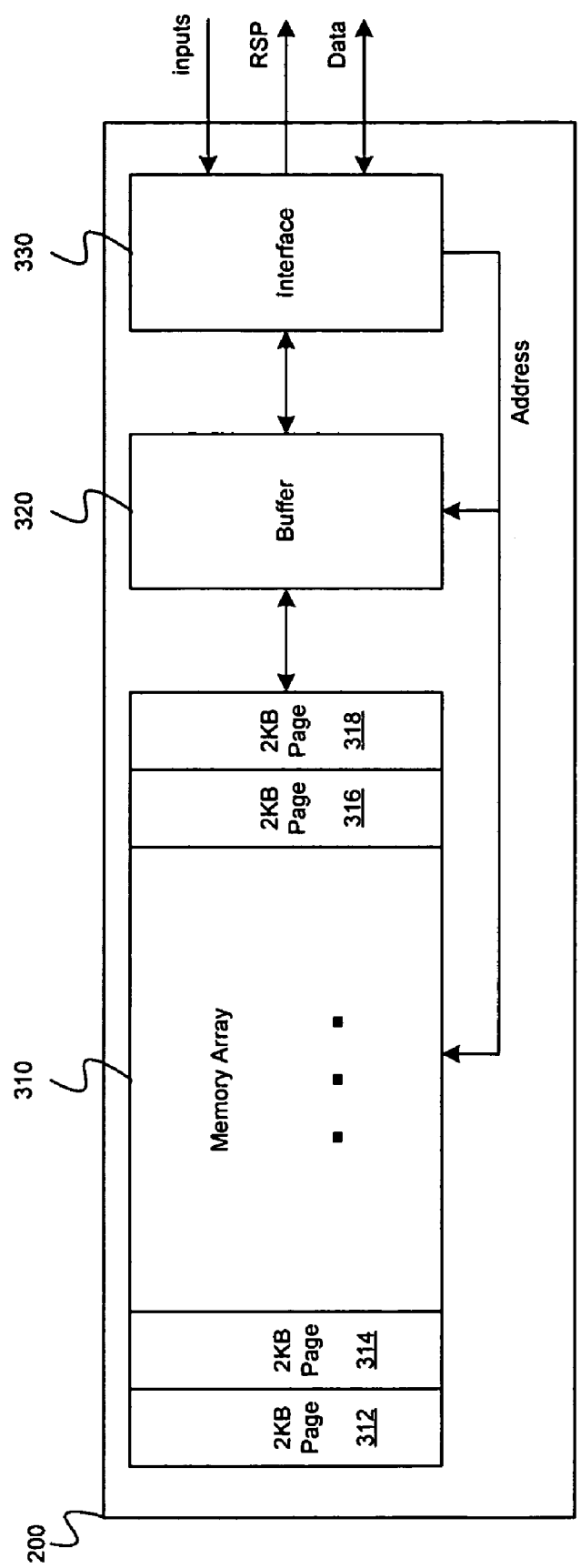
FIG. 3 is a block diagram illustrating an exemplary FLASH chip, which may be used in connection with an embodiment of the invention.

FIG. 3 is a block diagram illustrating an exemplary FLASH chip, which may be used in connection with an embodiment of the invention. Referring to FIG. 3, there is shown the FLASH chip 200 that comprises a memory array 310, a buffer 320, and an interface 330. The memory array 310 comprises a plurality of memory pages 312, 314, . . . , 316, and 318.

The plurality of plurality of memory pages 312, 314, . . . , 316, and 318 may be written to and read from. Each memory page, for example, the memory page 312, may have a capacity to store, for example, 2 KB of data plus 16 bytes of corresponding error correction code.

The buffer 320 may comprise enough memory locations to store, for example, at least one memory page of data plus its corresponding error correction code. The buffer 320 may be useful because programming a memory page with received data may be time consuming, for example, up to 1 mS. Accordingly, a device, for example, the mass storage interface module 100 (FIG. 1), may write a memory page of data and error correction code to the buffer. The mass storage interface module 100 may then access other MSDs without having to wait for the programming to be completed. The mass storage interface module 100 may, for example, poll an output response signal (RSP) on the FLASH chip 200 to determine whether the FLASH chip 200 may have finished programming the memory page. The FLASH chip 200 may indicate that it is in a programming mode by de-asserting the response signal (RSP). When the FLASH chip 200 has finished programming the data in the buffer 320, it may assert the response signal (RSP) to indicate that it is ready. Accordingly, the mass storage interface module 100 may write to the buffer 320 at a rate that may be as fast as, for example, 35 nS per byte, optionally start a data transfer with another MSD and/or transfer data to or from another MSD, and then re-access the FLASH chip 200 after the programming is finished.

Similarly, when a device, for example, the mass storage interface module 100, requests a memory page of data, the FLASH chip 200 may, for example, de-assert the response signal (RSP) to indicate that it is not ready. The FLASH chip 200 may fetch data from the specified memory page. This may take as long as, for example, 50 μS to fetch a memory page of data to the buffer 320. The mass storage interface module 100 may optionally initiate another data transfer with another MSD and/or transfer data to or from another MSD. The mass storage interface module 100 may then read from the buffer 320 at a rate as fast as, for example, 35 nS per byte.

The interface 330 may comprise logic and/or circuitry that may be adapted to communicate commands, addresses, and data from, for example, the mass storage interface module 100 to the memory array 310 and the buffer 320, and data from the buffer 320 to, for example, the mass storage interface module 100.

Figure 4:
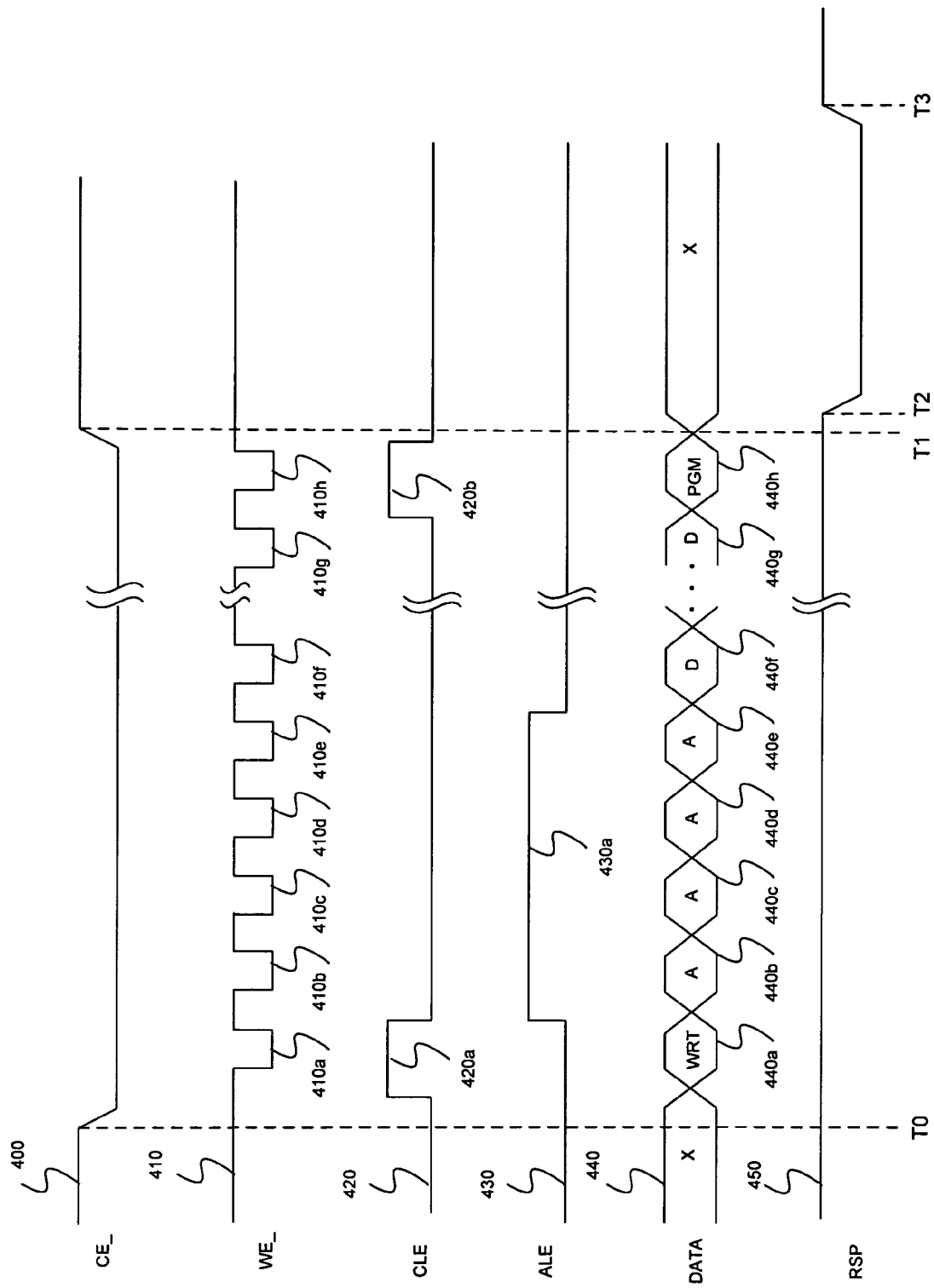
FIG. 4 is an exemplary timing diagram illustrating writing of data to a FLASH chip, in accordance with an embodiment of the invention.

FIG. 4 is an exemplary timing diagram illustrating writing of data to a FLASH chip, in accordance with an embodiment of the invention. Referring to FIG. 4, there is shown an input active low chip enable signal (CE_) 400, an input active low write enable signal (WE_) 410, an input active high command latch enable (CLE) signal 420, an input active high address latch enable signal (ALE) 430, a bidirectional data signal (DATA) 440, and an output active high response signal (RSP) 450.

The chip enable signal (CE_) 400 may be asserted for a time period from a time instant T0 to a time instant T1. The chip enable signal (CE_) 400 may indicate to a FLASH chip, for example, the FLASH chip 200 (FIG. 2a), that input signals may be valid. Data may be transmitted to the FLASH chip 200, for example, by the mass storage interface module 100 (FIG. 1), via the data signal DATA 440 at time periods 440a, 440b, 440c, 440d, 440e, 440f, . . . , 440g, and 440h. Accordingly, the write enable signal (WEJ 410 may be asserted during the time periods 410a, 410b, 410c, 410d, 410e, 410f, . . . , 410g, and 410h.

A write command may occur during time period 440a. Accordingly, the command latch enable (CLE) signal 420 may be asserted during the time period 410a that may substantially coincide with the time period 410a for the write enable signal (WE_) 410. Additionally, there may be, for example, four bytes of data during the time periods 440b, 440c, 440d, and 440e that may comprise four bytes of address of a memory page to which data may be written. Therefore, the address latch enable signal (ALE) 430 may be asserted during the time period 430a that may substantially coincide with the time periods 440b, 440c, 440d, and 440e. Accordingly, the assertion of the write enable signal (WE_) 410 during the time periods 410b, 410c, 410d, and 410e may be utilized to latch in each byte of the four address bytes. The number of bytes in an address may be design and/or implementation dependent. For illustrative purposes, four bytes are being utilized. Notwithstanding, the invention is not so limited, and other amounts of data may be utilized.

The mass storage interface module 100 may transmit data after the four bytes of address have been transmitted. The data bytes may be transmitted during the time periods 440f, . . . , 440g. Since the command latch enable (CLE) signal 420 and the address latch enable signal (ALE) 430 may not be asserted while the data is being transmitted, the FLASH chip 200 may store the received bytes in a buffer, for example, the buffer 320 (FIG. 3). After the last byte has been transmitted, the mass storage interface module 100 may transmit a program command during the time period 440h. The command latch enable (CLE) signal 420 may be asserted during the time period 420b. As a result, the asserted write enable signal (WE_) 410 during the time period 410h may be used to latch the program command. The FLASH chip 200 may program the data in a buffer, for example, the buffer 320, to the memory page indicated by the four address bytes at time periods 440b, 440c, 440d, and 440e. The response signal (RSP) may be de-asserted at time instant T2 to indicate that the FLASH chip 200 may be in program mode and may not be ready for data transfer. At time instant T3, the response signal (RSP) may be asserted in order to indicate that the FLASH chip 200 may be ready for further data transfer.

Figure 5:
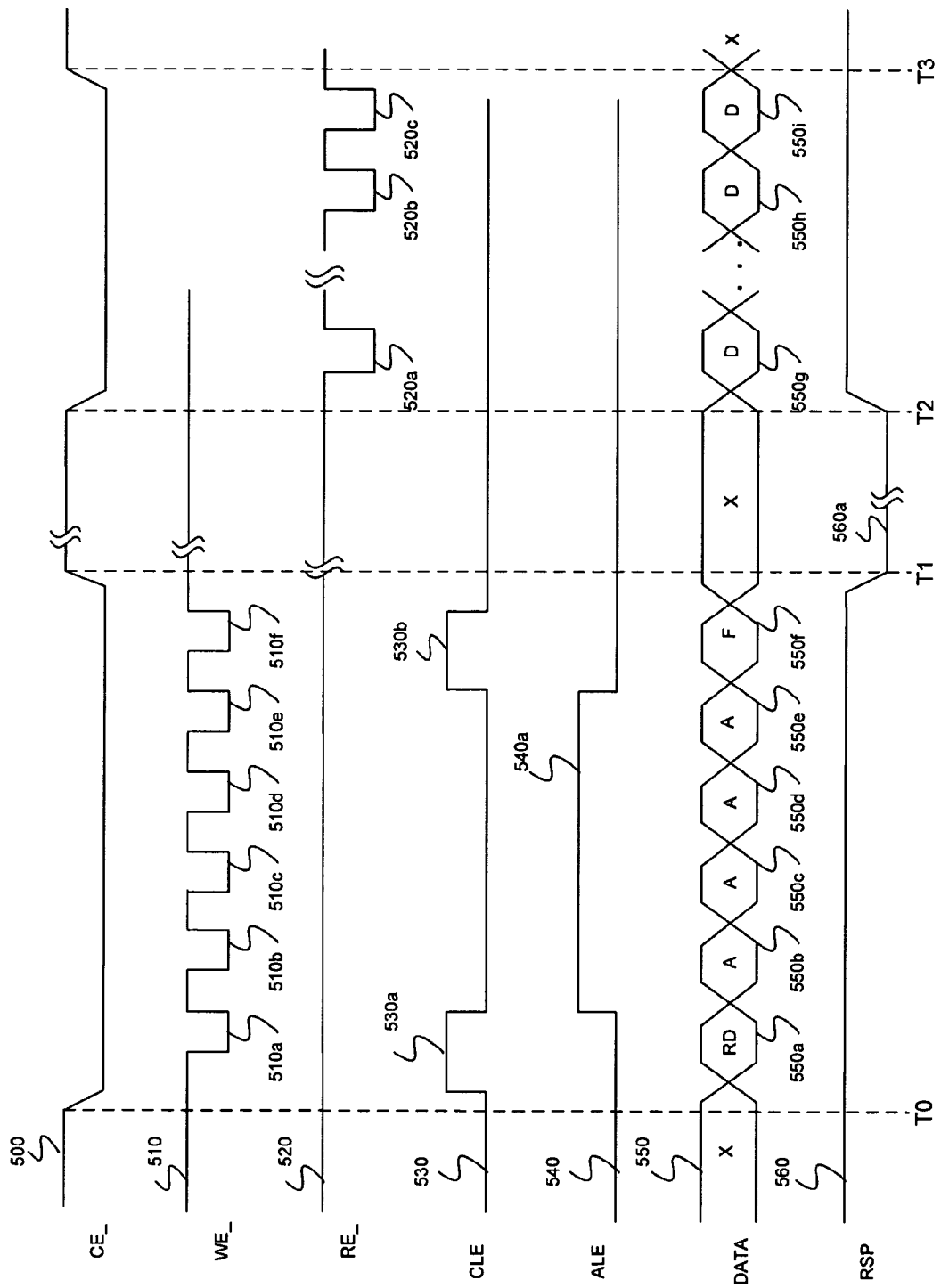
FIG. 5 is an exemplary timing diagram illustrating reading of data from a FLASH chip, in accordance with an embodiment of the invention.

FIG. 5 is an exemplary timing diagram illustrating reading of data from a FLASH chip, in accordance with an embodiment of the invention. Referring to FIG. 5, there is shown an active low input chip enable signal (CE_) 500, an active low input write enable signal (WE_) 510, an active low input read enable signal (RE_) 520, an active high input command latch enable (CLE) signal 530, an active high input address latch enable signal (ALE) 540, a bidirectional data signal (DATA) 550, and an active high output response signal (RSP) 560.

The chip enable signal (CE_) 500 may be asserted during a time period from a time instant T0 to a time instant T1. This may serve as an indication to a FLASH chip, for example, the FLASH chip 200 (FIG. 2a), that input signals may be valid during this time period. Data may be transmitted to the FLASH chip 200, for example, by the mass storage interface module 100 (FIG. 1), at time periods 550a, 550b, 550c, 550d, 550e, and 550f. Accordingly, the write enable signal (WE_) 510 may be asserted during the time periods 510a, 510b, 510c, 510d, 510e, and 510f.

A read command may be communicated during the time period 550a. Accordingly, the command latch enable (CLE) signal 530 may be asserted during the time period 530a that may substantially coincide with the time period 510a for the write enable signal (WE_) 510. Additionally, there may be four bytes of data during the time periods 550b, 550c, 550d, and 550e that may be, for example, four bytes of address of a memory page from which data may be read. Therefore, the address latch enable signal (ALE) 540 may be asserted during the time period 540a that may substantially coincide with the time periods 550b, 550c, 550d, and 550e. Accordingly, the assertion of the write enable signal (WE_) 510 during the time periods 510b, 510c, 510d, and 510e may be utilized to latch in each byte of the four address bytes. The number of bytes in the address may be design and/or implementation dependent.

The mass storage interface module 100 may transmit data on the data signal (DATA) 550 during the time period 550f that may be a fetch command. Accordingly, the command latch enable signal (CLE) 530 may be asserted during the time period 530b. The fetch command may be latched by the assertion of the write enable signal (WE_) 510 during the time period 510f. The FLASH chip 200 may then fetch data from the specified memory page in a memory array, for example, the memory array 310 (FIG. 3), to an internal buffer, for example, the buffer 320 (FIG. 3). The FLASH chip 200 may de-assert the response signal (RSP) 560 during the time period 560a during which it is transferring data from the memory array 310 to the buffer 320. This may act as an indication to the mass storage interface module 100 that the FLASH chip 200 may not be ready to receive data or transmit data.

After transmitting the fetch command during the time period 550f, the mass storage interface module 100 may wait until the FLASH chip 200 provides an indication that it is ready for data transfer by asserting the response signal (RSP) 560 at the end of the time period 560a. Alternatively, during the time period 560a, the mass storage interface module 100 may send commands and/or data, and/or read data from other MSDs 130, 140, and 150 (FIG. 1). Before the response signal (RSP) 560 is asserted at the end of the time period 560a, the mass storage interface module 100 may poll the response signal (RSP) 560 to see if it is asserted.

After a memory page is fetched in to the buffer 320, the FLASH chip 200 may assert the response signal (RSP) 560 to indicate that it is ready to transfer data. At time instant T2, when the mass storage interface module 100 detects that the response signal (RSP) 560 is asserted, it may assert the chip enable signal (CE_) 500 to read the fetched data. The assertion of the read signal (RE_) 520 during the time period 520a may indicate to the FLASH chip 200 to output the first byte of data from the buffer 320. In this manner, by asserting the read enable signal 520 during the time periods 520a, . . . , 520b, and 520c, the mass storage interface module 100 may read the data in the buffer 320 that may be output during the time periods 550g, . . . , 550h, and 550i, respectively.

FIG. 6a is an exemplary timing diagram illustrating writing of ECC to a mass storage device, in accordance with an embodiment of the invention. Referring to FIG. 6a, there is shown a Data In signal 600 and a Data Out signal 610. The Data In signal 600 may be data that may be communicated from the central bus buffer (CBUF) 112 (FIG. 1) to the error correction code generator (ECCG) 114 (FIG. 1). The Data Out signal 610 may comprise data that may be communicated from the ECCG 114 to the mass storage port controller (MSPC) 120 (FIG. 1).

The Data In signal 600 may comprise burst data 600a, which may be written to a MSD, for example, the MSD 130, 140 or 150. The Data Out signal 610 may comprise burst data 610a that may be the same as the burst data 600a and an error correction code 610b that may be generated from the burst data 610a. The ECCG 114 may generate the error correction code 610b while the burst data 610a is being communicated to the MSPC 120. The error correction code 610b may be communicated to the MSPC 120 after the burst data 610a. The length of the error correction code 610b may be, for example, 16 bytes in length and may be used to detect and correct up to, for example, 24 faulty bits. The length of the error correction code may be design and/or implementation dependent.

FIG. 6b is an exemplary timing diagram illustrating reading data and ECC from a mass storage device, in accordance with an embodiment of the invention. Referring to FIG. 6b, there is shown a Data In signal 620 and a Data Out signal 630. The Data In signal 620 may be data that may be communicated from the mass storage data controller (MSDC) 118 (FIG. 1) to the error locator and corrector (ELC) 116. The Data Out signal 630 may comprise data that may be communicated from the ELC 116 to the CBUF 112.

The Data In signal 620 may comprise burst data 620a and error correction signal 620b that may be from a MSD, for example, the MSD 130, 140 or 150. The Data Out signal 630 may comprise a corrected burst data 630a that may have corrected erroneous data bits that may be present in the burst data 620a. The error correction code 620b may be received by the ELC 116 after the burst data 620a, and may be used to locate and correct errors that may exist in the burst data 620a. The corrected burst data 630a may be written to the CBUF 112. In this manner, for example, a 16 byte error correction code 620b may be used to correct up to 24 faulty bits in the burst data 620a. The length of the error correction code may be design and/or implementation dependent.

Figure 7A:
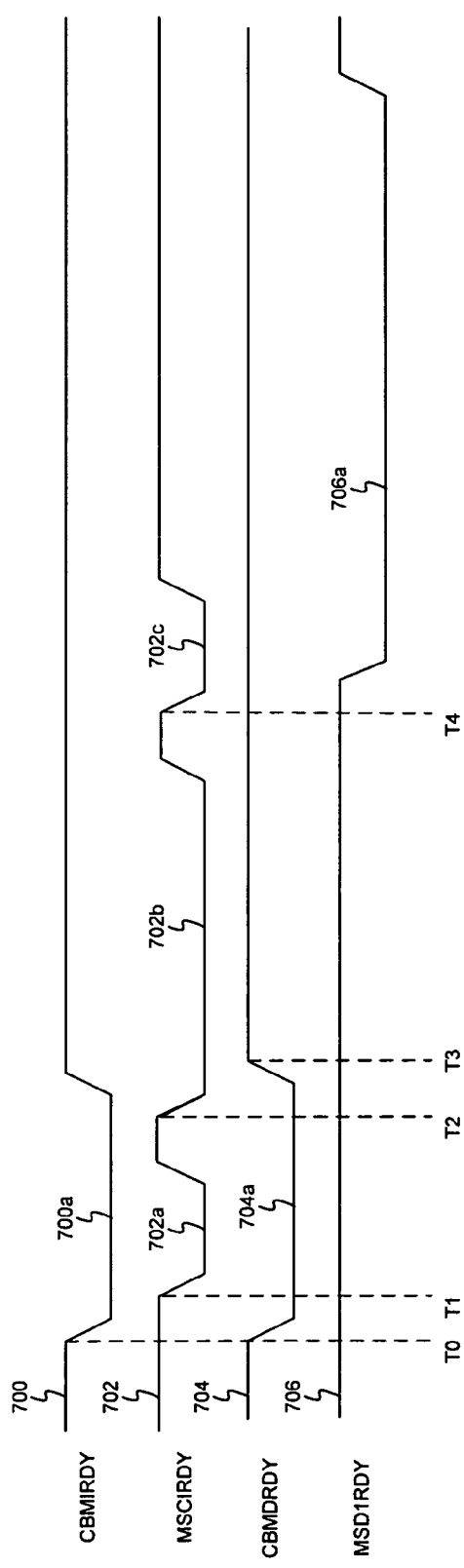
FIG. 7a is an exemplary timing diagram illustrating instruction execution for writing burst data to a mass storage device, in accordance with an embodiment of the invention.

FIG. 7a is an exemplary timing diagram illustrating instruction execution for writing burst data to a mass storage device, in accordance with an embodiment of the invention. Referring to FIG. 7a, there is shown an active high CBM instruction ready signal (CBMIRDY) 700, an active high MSC instruction ready signal (MSCIRDY) 702, an active high CBM data ready signal (CBMDRDY) 704, and an active high MSD1 ready signal (MSD1RDY) 706.

A CPU, for example, the CPU 102 may have communicated to the IQ 110, via the CBS 108, a plurality of instructions that may be executed to write data to a MSD1, which may be the MSD 130, 140 or 150. The CBM instruction ready signal (CBMIRDY) 700 may be asserted to indicate that that the CBM 106 may be ready to receive instructions from the instruction queue (IQ) 110, and deasserted to indicate that it may not be ready to receive an instruction from the IQ 110 because it may be busy executing a previous instruction from the IQ 110. Similarly, the MSC instruction ready signal (MSCIRDY) 702 may be asserted or deasserted to indicate that the MSC 117 may be ready to receive an instruction from the IQ 110 or that it is busy executing an instruction, respectively. The CBM data ready signal (CBMDRDY) 704 may be de-asserted after an instruction to transfer data is received by the CBM 106. The CBM data ready signal (CBMDRDY) 704 may be asserted when the CBM 106 determines that data may be transferred into or out of the CBUF 112. The MSD1 ready signal (MSD1RDY) 706 may be asserted to indicate that the MSD1 may be ready to transfer the data.

At time instant T0, the CBM instruction ready signal (CBMIRDY) 700 may be asserted, and the IQ 110 may communicate an instruction to the CBM 106. The instruction may indicate that data may be transferred from a memory, for example, the system memory 104, to the CBUF 112, and the address of the system memory 104 where the data may be located. The CBM instruction ready signal (CBMIRDY) 700 may be de-asserted during a time period 700a until it may be ready to receive another instruction to execute. The CBM data ready signal (CBMDRDY) 704 may be de-asserted during a time period 704a until data gets transferred from the system memory 104 to the CBUF 112.

At time instant T1, an instruction to send a write command and a burst address to the MSD1 may be communicated to the MSC 117 from the IQ 110. The burst address may comprise a memory page address for the MSD1. The MSC instruction ready signal (MSCIRDY) 702 may be de-asserted during the time period 702a while the burst address may be communicated to the MSD1. At time instant T2, when the MSC instruction ready signal (MSCIRDY) 702 may be in an asserted state after the memory page address gets communicated to the MSD1, an instruction to send burst data may be communicated to the MSC 117. The MSC instruction ready signal (MSCIRDY) 702 may be de-asserted during the time period 702b while transfer of data occurs from the CBUF 112 to the MSD1. However, since the CBM data ready signal (CBMDRDY) 704 may not indicate that the CBUF 112 is filled with data until the time instant T3, data transfer from the CBUF 112 to the MSD1 may not begin until at least the time instant T3.

At time instant T4, when the MSC instruction ready signal (MSCIRDY) 702 may be in an asserted state after the data in the CBUF 112 gets communicated to the MSD1, an instruction to send a program command to the MSD1 may be communicated to the MSC 117. Therefore, the MSC instruction ready signal (MSCIRDY) 702 may be de-asserted during the time period 702c. In this regard, the MSD1 ready signal (MSD1RDY) 706 may be de-asserted during the time period 706a while data, for example, in the buffer 320 of the FLASH chip 200 (FIG. 3), may be programmed to a memory page in the memory array 310 (FIG. 3).

Figure 7B:
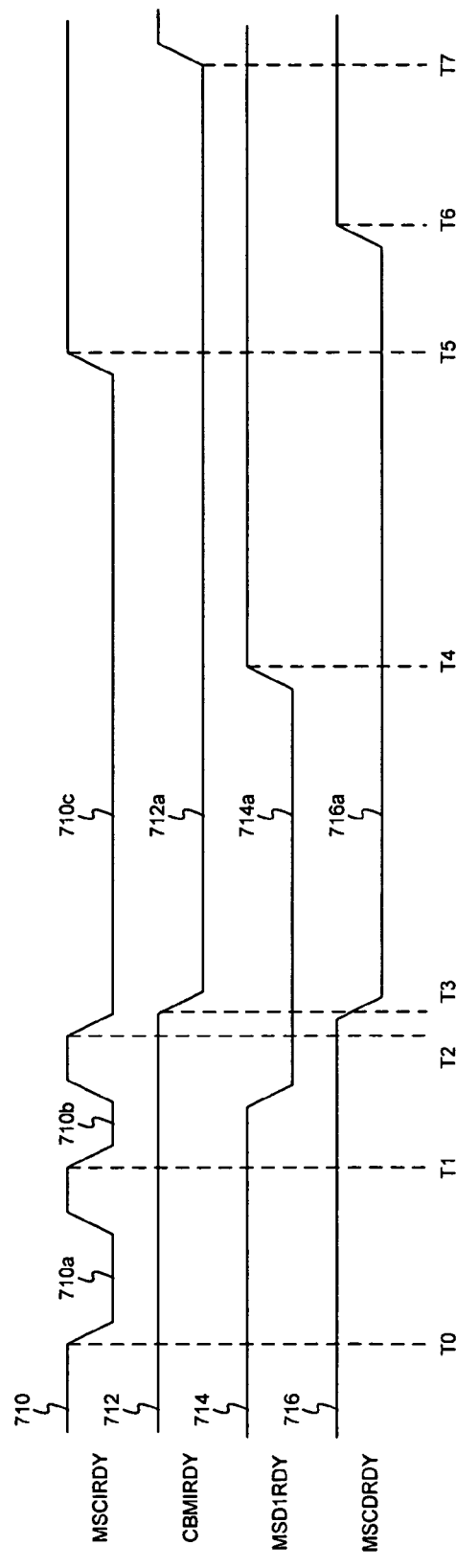
FIG. 7b is an exemplary timing diagram illustrating instruction execution for reading burst data from a mass storage device, in accordance with an embodiment of the invention.

FIG. 7b is an exemplary timing diagram illustrating instruction execution for reading burst data from a mass storage device, in accordance with an embodiment of the invention. Referring to FIG. 7b, there is shown an active high MSC instruction ready signal (MSCIRDY) 710, an active high CBM instruction ready signal (CBMIRDY) 712, an active high MSD1 ready signal (MSD1RDY) 714, and an active high MSC data ready signal (MSCDRDY) 716. The MSC data ready signal (MSCDRDY) 716 may be de-asserted while data is being transferred from the MSD1 to the CBUF 112. Whether CBM instruction ready signal (CBMIRDY) 712 and MSD1 ready signal (MSD1RDY) 714 are active high may be design and/or implementation dependent, and the invention is not limited in this regard.

At time instant T0, an instruction to send a read command to the MSD1 may be communicated to the MSC 117 by the IQ 110. The MSC instruction ready signal (MSCIRDY) 710 may be de-asserted during the time period 710a while the read command may be communicated to the MSD1. At time instant T1, when the MSC instruction ready signal (MSCIRDY) 710 may be in an asserted state after the read command gets communicated to the MSD1, the instruction to send a burst address for the MSD1 may be communicated to the MSC 117. The MSC instruction ready signal (MSCIRDY) 702 may be de-asserted during the time period 710b while the burst address may be communicated to the MSD1. The MSD1 ready signal (MSD1RDY) 714 may be de-asserted during the time period 714a when data gets transferred from, for example, the memory array 310 to the buffer 320 in the FLASH chip 200 (FIG. 3). The MSD1 ready signal (MSD1RDY) 714 may be asserted at a time instant T4 to indicate that the MSD1 may be able to start transferring data to the MSC 117.

At time instant T2, the IQ 110 may communicate instructions to the MSC 117 and to the CBM 106 to transfer data from the MSD1 to the system memory 104. The CBM instruction ready signal (CBMIRDY) 712 may be de-asserted at time instant T3 to indicate that it may be executing an instruction and may not be ready for another instruction. The CBM instruction ready signal (CBMIRDY) 712 may be de-asserted during a time period 712a until the data from the MSD1 gets transferred to the system memory 104. The MSC data ready signal (MSCDRDY) 716 may be de-asserted during the time period 716a while the MSC 117 may be transferring data from the MSD1 to the CBUF 112.

At time instant T4, the MSD1 ready signal (MSD1RDY) 714 may be asserted since the data may be ready to be transferred from the MSD1 to the MSC 117. At time instant T5, data may be transferred to the ELC 116, and the MSC instruction ready signal (MSCIRDY) 710 may be asserted since the MSC 117 may be ready to accept new instructions. The period of time from the time instant T5 to a time instant T6 may comprise the time used by the ELC 116 to finish writing the corrected data to the CBUF 112. The MSC data ready signal (MSCDRDY) 716 may be asserted at the time instant T6 when transfer of data to the CBUF 112 is complete. The period of time from the time instant T6 to a time instant T7 may comprise the time used to transfer the data from the CBUF 112 to the system memory 104 via the CBM 106. The CBM instruction ready signal (CBMIRDY) 712 may be asserted at time instant T7.

Figure 8:
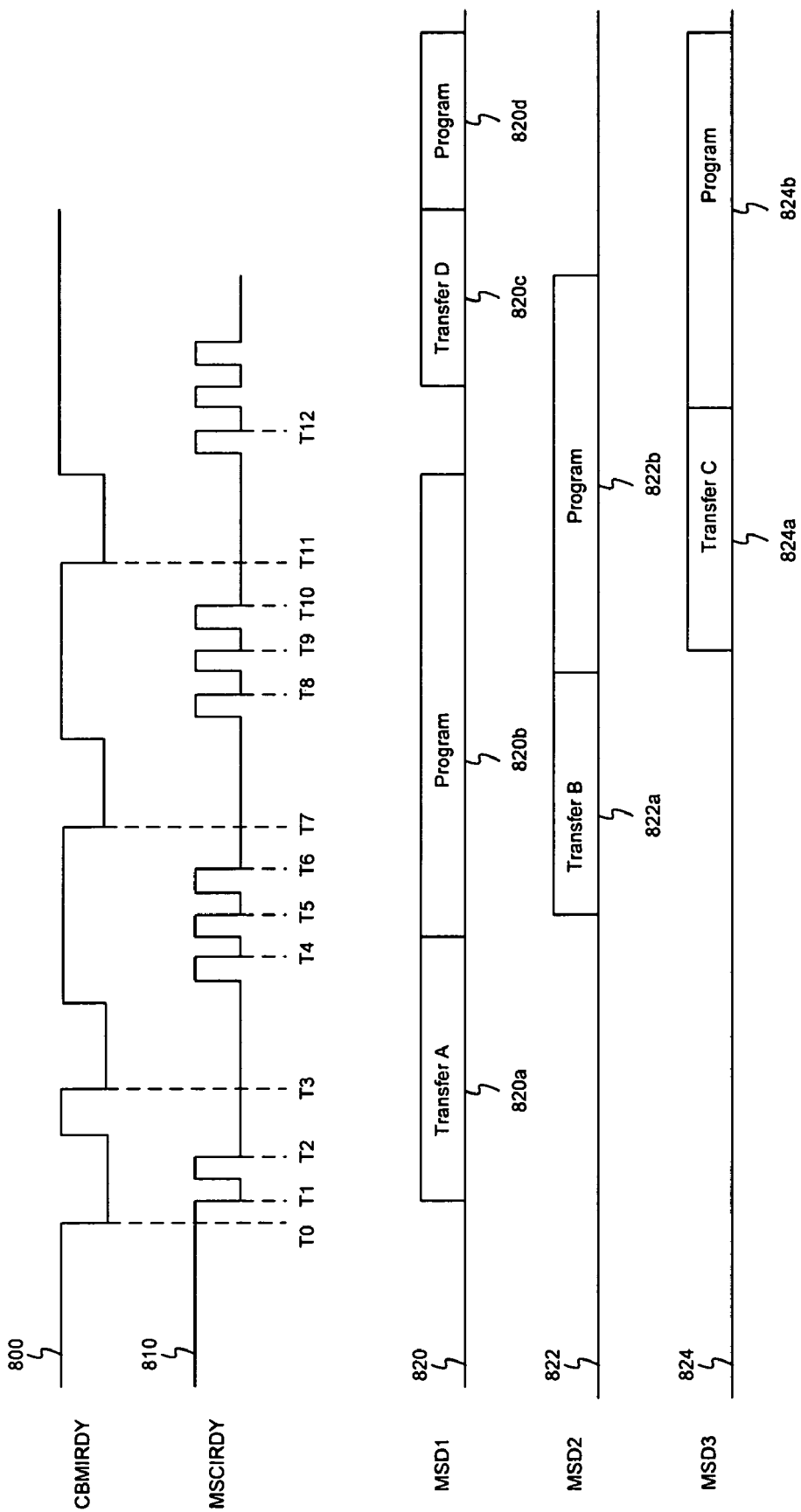
FIG. 8 is an exemplary timing diagram illustrating instruction execution for writing multiple bursts of data to a mass storage device, in accordance with an embodiment of the invention.

FIG. 8 is an exemplary timing diagram illustrating instruction execution for writing multiple bursts of data to a mass storage device, in accordance with an embodiment of the invention. Referring to FIG. 8, there is shown an active high CBM instruction ready signal (CBMIRDY) 800 and an active high MSC instruction ready signal (MSCIRDY) 810. The active high CBM instruction ready signal (CBMIRDY) 800 may be generated by the CBM 106 and the active high MSC instruction ready signal (MSCIRDY) 810 may be generated by the MSC 117. There is also shown a MSD1 activity signal 820 that may denote activity at an MSD1, for example, the MSD 130, a MSD2 activity signal 822 that may denote activity at an MSD2, for example, the MSD 140, and a MSD3 activity signal 824 that may denote activity at an MSD3, for example, the MSD 150. The activities may comprise, for example, transferring commands and data from the mass storage interface module 100 to the MSDs 130, 140, and 150, and programming data transferred to an I/O buffer of the MSD 130, 140 or 150 to memory arrays.

At time instant T0, the IQ 110 may communicate an instruction to the CBM 106 to load burst data A to a first buffer, for example, the buffer 112a, in the CBUF 112 from the system memory 104. At time instant T1, the IQ 110 may communicate an instruction to the MSC 117 to send a write command and a corresponding address to the MSD1. At time instant T2, data in the first buffer located in the CBUF 112 may be communicated to the MSD1. At time instant T4, the IQ 110 may communicate an instruction to the MSC 117 to send a program command to the MSD1. The MSC 117 may send a program command to the MSD1 after the burst data A gets transferred to the MSD1. The MSD1 activity signal 820 illustrates the transfer of commands and data during the time period 820a. The program command that was sent to the MSD1 may initiate a programming activity in which the data transferred may be programmed into, for example, the memory array 310 (FIG. 3). The programming may occur during the time period 820b.

At time instant T3, the IQ 110 may communicate an instruction to the CBM 106 to load burst data B to a second buffer, for example, the buffer 112n, in the CBUF 112 from the system memory 104. At time instant T5, the IQ 110 may communicate an instruction to the MSC 117 to send a write command and a corresponding address to the MSD2. At time instant T6, data in the second buffer located in the CBUF 112 may be communicated to the MSD2. At time T8, the IQ 110 may communicate an instruction to the MSC 117 to send a program command to the MSD2. The MSC 117 may send a program command to the MSD2 after the burst data B gets transferred to the MSD2. The MSD2 activity signal 822 illustrates the transfer of commands and data during the time period 822a. The program command that was sent to the MSD2 may initiate a programming activity in which the data transferred may be programmed into, for example, the memory array 310 (FIG. 3). The programming may occur during the time period 822b.

At time instant T7, the IQ 110 may communicate an instruction to the CBM 106 to load burst data C to the first buffer in the CBUF 112 from the system memory 104. At time instant T9, the IQ 110 may communicate an instruction to the MSC 117 to send a write command and address to the MSD3. At time instant T10, data in the first buffer located in the CBUF 112 may be communicated to the MSD3. At time instant T12, the IQ 110 may communicate an instruction to the MSC 117 to send a program command to the MSD3. The MSC 117 may send a program command to the MSD3 after the burst data C gets transferred to the MSD3. The MSD3 activity signal 824 illustrates the transfer of commands and data during the time period 824a. The program command that was sent to the MSD3 may initiate a programming activity in which the data transferred may be programmed into, for example, the memory array 310 (FIG. 3). The programming may occur during the time period 824b.

At time instant T11, the IQ 110 may communicate an instruction to the CBM 106 to load burst data D to the second buffer located in the CBUF 112 from the system memory 104. The destination for the burst data D may be, for example, the MSD1 since the MSD1 may have finished programming the data burst A into the memory array 320 (FIG. 3). The burst data D may be transferred and programmed during time periods 820c and 820d, respectively, on the MSD1 activity signal 820.

Figure 9:
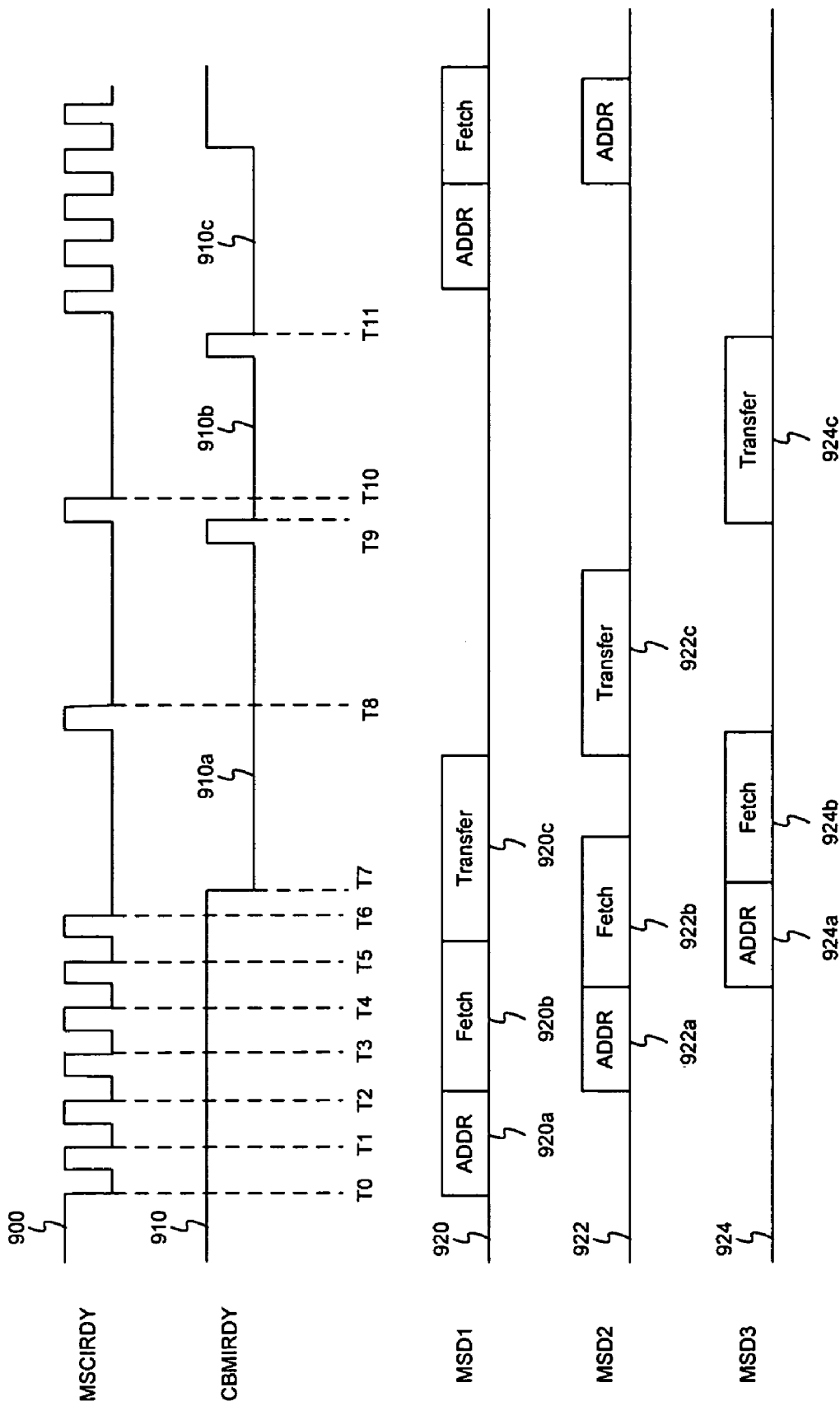
FIG. 9 is an exemplary timing diagram illustrating instruction execution for reading multiple bursts of data from a mass storage device, in accordance with an embodiment of the invention.

FIG. 9 is an exemplary timing diagram illustrating instruction execution for reading multiple bursts of data from a mass storage device, in accordance with an embodiment of the invention. Referring to FIG. 9, there is shown an active high MSC instruction ready signal (MSCIRDY) 900 and an active high CBM instruction ready signal (CBMIRDY) 910. The active high MSC instruction ready signal (MSCIRDY) 900 may be generated by MSC 117 and the active high CBM instruction ready signal (CBMIRDY) 910 may be generated by CBM 106. There is also shown a MSD1 activity signal 920 that may denote activity at an MSD1, for example, the MSD 130, a MSD2 activity signal 922 that may denote activity at an MSD2, for example, the MSD 140, and a MSD3 activity signal 924 that may denote activity at an MSD3, for example, the MSD 150. The activities may comprise, for example, communicating addresses and commands to the MSDs 130, 140, and 150, fetching data from a memory array to an output buffer at the MSD 130, 140, or 150, and transferring data from the MSD 130, 140 or 150 to the mass storage interface module 100.

At time instant T0, an instruction may be communicated from the IQ 110 to the MSC 117 to read burst data A from the MSD1 to the CBUF 112. This may result in a read command and an address being communicated to the MSD1 during the time period 920a on the MSD1 activity signal 920. At time instant T1, the IQ 110 may communicate an instruction to the MSC 117 to send a fetch command to the MSD1. The MSD1 may fetch data from the communicated address, to the buffer, for example, the buffer 320 on the FLASH chip 200. This may occur during the time period 920b on the MSD1 activity signal 920. The communicated address may be an address of a memory page in a memory array, for example, the memory array 310 on the FLASH chip 200 (FIG. 3), At time instant T2, an instruction may be communicated from the IQ 110 to the MSC 117 to read burst data B from the MSD2 to the CBUF 112. This may result in a read command and a corresponding address being communicated to the MSD2 during the time period 922a on the MSD2 activity signal 922. At time instant T3, the IQ 110 may communicate an instruction to the MSC 117 to send a fetch command to the MSD2. The MSD2 may fetch data from the communicated address to the buffer, for example, the buffer 320 on the FLASH chip 200. This may occur during the time period 922b on the MSD2 activity signal 922. The communicated address may be, for example, an address of a memory page in the memory array 310 on the FLASH chip 200 (FIG. 3).

At time instant T4, an instruction may be communicated from the IQ 110 to the MSC 117 to read burst data C from the MSD3 to the CBUF 112. This may result in a read command and an address being communicated to the MSD3 during the time period 924a on the MSD3 activity signal 924. At time instant T5, the IQ 110 may communicate an instruction to the MSC 117 to send a fetch command to the MSD3. The MSD3 may fetch data from the communicated address to the buffer, for example, the buffer 320 on the FLASH chip 200. This may occur during the time period 924b on the MSD3 activity signal 924. The communicated address may be an address of a memory page in a memory array, for example, the memory array 310 on the FLASH chip 200 (FIG. 3), At time instant T6, an instruction may be communicated to the MSC 117 to transfer data from the MSD1 to a first buffer, for example, the buffer 112a, which is located in the CBUF 112. The transfer data to the CBUF 112 may occur during the time period 920c on the MSD1 activity signal 920. At time instant T7, the IQ 110 may communicate an instruction to the CBM 106 to transfer data in the CBUF 112 to the system memory 104. The CBM instruction ready signal (CBMIRDY) 910 may be de-asserted during the time period 910a when the data is being transferred.

At time instant T8, the IQ 110 may communicate an instruction to the MSC 117 to transfer data from the MSD2 to a second buffer, for example, the buffer 112n, which is located in the CBUF 112. The transfer of data to the CBUF 112 may occur during the time period 922c on the MSD2 activity signal 922. At time instant T9, the IQ 110 may communicate an instruction to the CBM 106 to transfer data in the CBUF 112 to the system memory 104. The CBM instruction ready signal (CBMIRDY) 910 may be de-asserted during the time period 910b when the data is being transferred.

At time instant T10, the IQ 110 may communicate an instruction to the MSC 117 to transfer data from the MSD3 to the first buffer in the CBUF 112. The transfer of data to the CBUF 112 may occur during the time period 924c on the MSD3 activity signal 924. At time instant T11, the IQ 110 may communicate an instruction to the CBM 106 to transfer data in the CBUF 112 to the system memory 104. The CBM instruction ready signal (CBMIRDY) 910 may be de-asserted during the time period 910*c* when the data is being transferred.

Figure 10:
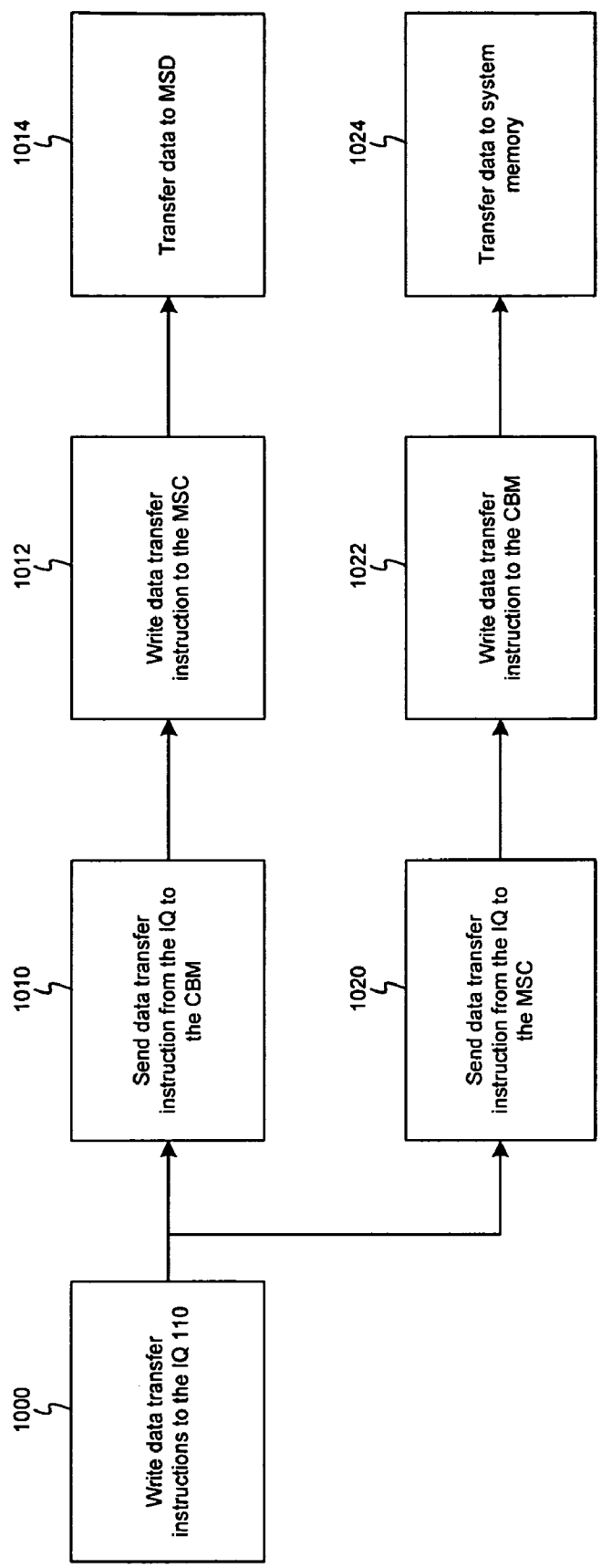
FIG. 10 is a flow diagram illustrating an exemplary routine for high data throughput for mass storage devices, in accordance with an embodiment of the invention.

FIG. 10 is a flow diagram illustrating an exemplary routine for high data throughput for mass storage devices, in accordance with an embodiment of the invention. Referring to FIG. 10, and with respect to FIG. 1, there is shown a plurality of steps 1000 to 1024 that may be utilized for high data throughput between a mass storage interface module 100 (FIG. 1) and MSDs 130, 140 and 150. In step 1000, at least one instruction that may be appropriate for the data transfer involved may be stored in the instruction queue (IQ) 110. This is described in detail with respect to the FIGS. 7*a*, 7*b*, 8, and 9.

When writing data to an MSD 130, 140, or 150, in step 1010, the IQ 110 may communicate at least one instruction to the CBM 106 to transfer data from the system memory 104 to the CBUF 112. In step 1012, the IQ 110 may communicate at least one instruction to the MSC 117 to transfer data in the CBUF 112 to an MSD 130, 140 or 150. In step 1014, the data may be transferred from the system memory 104 to the desired address in the MSD 130, 140, or 150.

Similarly, when reading data from an MSD 130, 140, or 150, in step 1020, the IQ 110 may communicate at least one instruction to the MSC 117 to transfer data from the desired address in the MSD 130, 140, or 150 to the CBUF 112. In step 1022, the IQ 110 may communicate at least one instruction to the CBM 106 to transfer data in the CBUF 112 to the system memory 104. In step 1024, the data may therefore be appropriately transferred from the desired address in the MSD 130, 140, or 150 to the system memory 104.

Although various embodiments of the invention may have illustrated transfer of data between a system memory 104 and an MSD, for example, the MSD 130, 140 or 150, the invention need not be so limited. For example, data may be transferred from one MSD to another. This may be accomplished by reading data from an MSD, for example, the MSD 130 to the CBUF 112, and then transferring the data in the CBUF 112 to another MSD, for example, the MSD 140.

With reference to FIG. 1, various aspects of the invention may comprise interleaving accesses to a plurality of mass storage devices (MSDs), for example the MSDs 130, 140, and 150, communicatively coupled to a portable media processing device 190. There may be interleaved transfer of data corresponding to the interleaved accesses to the plurality of MSDs 130, 140 and 150 communicatively coupled to the portable media processing device 190. At least a portion of the plurality of MSDs, for example, the MSDs 130, 140, and 150, may be communicatively coupled internally to the portable media processing device 190. A remaining portion of the plurality of MSDs, for example, the MSDs 130, 140, and 150, may be communicatively coupled externally to the portable media processing device 190.

One or more common signals may be shared and utilized for interfacing with the plurality of MSDs 130, 140, and 150. Multiple instructions from a CPU, for example, the CPU 102, may be used for transferring data, and the instructions may be stored in the portable media processing device 190. At least one instruction may be executed by at least one circuitry, for example, the MSC 117 and/or the CBM 106, in the mass storage interface module 190. A system memory, for example, the system memory 104, may be accessed via a system bus, for example, the central bus 101, independently of the CPU 102 in the portable media processing device 190 for transferring data to and from the MSDs 130, 140, and 150. At least one address of desired data may be communicated to a first of the MSDs 130, 140, and 150. Then at least one address of desired data may be communicated to a second of the MSDs 130, 140, and 150 while the first of the MSDs 130, 140, and 150 may be filling its output buffer with desired data.

Data received from one of the MSDs 130, 140, and 150 may be transferred to the system memory 104. Data received by a first buffer, for example, the buffer 112*a*, from a first of the MSDs 130, 140, and 150 may be transferred to the system memory 104 while a second buffer, for example, the buffer 112*n*, may receive data from a second of the MSDs 130, 140, and 150. Data received from one of the MSDs 130, 140, and 150 may be error corrected via a received error correction code from the same MSD 130, 140, or 150. Errors in received data in a first buffer may be corrected while receiving data from a second of the MSDs 130, 140, and 150.

Data may be transferred from the system memory 104 to one of the MSDs 130, 140, and 150. Data in the buffer 112*a* may be transferred to a first of the MSDs 130, 140, and 150 while data may be transferred from the system memory 104 to the buffer 112*n* for transfer to a second of the MSDs 130, 140, and 150. Data in the buffer 112*n* may be transferred to a second of the MSDs 130, 140, and 150 while data transferred to the first of the MSDs 130, 140, and 150 may be in the process of being programmed into the same MSD 130, 140, or 150. An error correction code may be generated as data is being transferred to one of the plurality of MSDs 130, 140, and 150, and the generated error correction code may be transferred to the same MSD 130, 140, or 150 after the data is transferred.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communicating data, the method comprising:
   interleaving accesses to a plurality of mass storage devices communicatively coupled to a portable media processing device, wherein at least a first portion of the plurality of mass storage devices is communicatively, coupled internally; to the portable media processing device and a second portion of the plurality of mass storage devices is communicatively coupled externally to the portable media processing device; and
   interleaving transfer of data corresponding to said interleaved accesses to said plurality of mass storage devices communicatively coupled to said portable media processing device, wherein:
      a first portion of said data from a first mass storage device is communicated to and/or from system memory via a first dedicated buffer that is external to said first mass storage device; and
      a second portion of said data from a second mass storage device is communicated to and/or from said system memory via a second dedicated buffer that is external to said second mass storage device.

2. The method according to claim 1, comprising sharing at least one common signal for interfacing with said plurality of mass storage devices.

3. The method according to claim 1, comprising storing multiple instructions from a CPU in said portable media processing device for said transferring data, wherein said multiple instructions are executed by at least one circuitry in a mass storage interface module.

4. The method according to claim 1, comprising accessing said system memory via a system bus independently of a CPU in said portable media processing device for said transferring data to and from said plurality of mass storage devices.

5. The method according to claim 1, comprising communicating at least one address for desired data to at least one of said plurality of mass storage devices.

6. The method according to claim 1, comprising communicating at least one address for desired data to a second of said plurality of mass storage devices while a first of said plurality of mass storage devices is filling its output buffer with desired data.

7. The method according to claim 1, comprising transferring data received from one of said plurality of mass storage devices to said system memory.

8. The method according to claim 1, comprising transferring data received by said first dedicated buffer from said first mass storage device to said system memory while receiving data from said second mass storage device in said second dedicated buffer.

9. The method according to claim 1, comprising correcting errors in data received from one of said plurality of mass storage devices via a received error correction code from a same said one of said plurality of mass storage devices.

10. The method according to claim 1, comprising correcting errors in received data in said first dedicated buffer while receiving data from said second mass storage device in said second dedicated buffer.

11. The method according to claim 1, comprising transferring data from said system memory to one of said plurality of mass storage devices.

12. The method according to claim 1, comprising transferring data in said first dedicated buffer to said first mass storage device while transferring data from said system memory to said second dedicated buffer for transfer to said second mass storage device.

13. The method according to claim 12, comprising transferring data in said second dedicated buffer to said second mass storage device while said transferred data to said first mass storage device is being programmed into said first mass storage device.

14. The method according to claim 1, comprising generating error correction code as data is being transferred to one of said plurality of mass storage devices.

15. The method according to claim 14, comprising transferring said generated error correction code to a same said one of said plurality of mass storage devices after said transferring of said data.

16. A system for communicating data, the system comprising:
   one or more circuits that are operable to interleave accesses to a plurality of mass storage devices communicatively coupled to a portable media processing device, wherein at least a first portion of the plurality of mass storage devices is communicatively coupled internally to the portable media processing device; and a second portion of the plurality of mass storage devices is communicatively coupled externally to the portable media processing device; and
   said one or more circuits are operable to interleave transfer of data corresponding to said interleaved accesses to said plurality of mass storage devices communicatively coupled to said portable media processing device, wherein:
      a first portion of said data from a first mass storage device is communicated to and/or from system memory via a first dedicated buffer that is external to said first mass storage device; and
      a second portion of said data from a second mass storage device is communicated to and/or from said system memory via a second dedicated buffer that is external to said second mass storage device.

17. The system according to claim 16, wherein said one or more circuits comprise a mass storage controller in a mass storage interface module, wherein said mass storage controller is operable to share at least one common signal for interfacing with said plurality of mass storage devices.

18. The system according to claim 16, wherein said one or more circuits comprise a central bus buffer in a mass storage interface module, wherein said central bus buffer is operable to store multiple instructions from a CPU in said portable media processing device for said transferring data, and wherein at least one of said multiple instructions is executed by at least one circuitry in said mass storage interface module.

19. The system according to claim 16, wherein said one or more circuits comprise a central bus master in a mass storage interface module, wherein said central bus master is operable to access said system memory via a system bus independently of a CPU in said portable media processing device for said transferring data to and from said plurality of mass storage devices.

20. The system according to claim 16, wherein said one or more circuits comprise a mass storage controller in a mass storage interface module, wherein said mass storage controller is operable to communicate at least one address for desired data to at least one of said plurality of mass storage devices.

21. The system according to claim 16, wherein said one or more circuits comprise a mass storage controller in a mass storage interface module, wherein said mass storage controller is operable to communicate at least one address for desired data to a second of said plurality of mass storage devices while a first of said plurality of mass storage devices is filling its output buffer with desired data.

22. The system according to claim 16, wherein a mass storage interface module transfers data received from one of said plurality of mass storage devices to said system memory.

23. The system according to claim 16, wherein said one or more circuits comprise a mass storage interface module that is operable to transfer data received by said first dedicated buffer from said first mass storage device to said system memory while receiving data from said second mass storage device in said second dedicated buffer.

24. The system according to claim 16, wherein said one or more circuits comprise an error locator and corrector in a mass storage interface module, wherein said error locator and corrector is operable to correct errors in said transferred data from one of said plurality of mass storage devices via a received error correction code from a same said one of said plurality of mass storage devices.

25. The system according to claim 16, wherein said one or more circuits comprise an error locator and corrector in a mass storage interface module, wherein said error locator and corrector is operable to correct errors in said transferred data in said first dedicated buffer while receiving data from a second of said plurality of mass storage devices.

26. The system according to claim 16, wherein said one or more circuits comprise a mass storage interface module that is operable to transfer data from said system memory to one of said plurality of mass storage devices.

27. The system according to claim 16, wherein said one or more circuits comprise a central bus master in a mass storage interface module, wherein said central bus master is operable to communicate data in said first dedicated buffer to said first mass storage device while communicating data from said system memory to said second dedicated buffer for transfer to said second mass storage device.

28. The system according to claim 27, wherein said mass storage interface module is operable to communicate data in said second dedicated buffer to said second mass storage device while said communicated data to said first mass storage device is being programmed into said first mass storage device.

29. The system according to claim 16, wherein said one or more circuits comprise an error correction code generator in a mass storage interface module, wherein said error correction code generator is operable to generate error correction code as data is being transferred to one of said plurality of mass storage devices.

30. The system according to claim 29, wherein said one or more circuits comprise a mass storage controller in said mass storage interface module, wherein said mass storage controller is operable to transfer said generated error correction code to a same said one of said plurality of mass storage devices after said transferring of said data.

* * * * *

UNITED STATES PATENT AND TRADEMARK OFFICE
CERTIFICATE OF CORRECTION

PATENT NO.         : 8,402,233 B2
APPLICATION NO.    : 11/220731
DATED              : March 19, 2013
INVENTOR(S)        : Paul Yang Lu Page 1 of 1

It is certified that error appears in the above-identified patent and that said Letters Patent is hereby corrected as shown below:

In the Claims

Column 17
Line 7, Claim 1, please replace "communicatively," with --communicatively--.

Column 17
Line 8, Claim 1, please replace "internally;" with --internally--.

Column 18
Line 20, Claim 16, please replace "device;" with --device--.

Signed and Sealed this
Eleventh Day of March, 2014

Michelle K. Lee
*Deputy Director of the United States Patent and Trademark Office*